(12) United States Patent
Yung et al.

(10) Patent No.: US 7,664,048 B1
(45) Date of Patent: Feb. 16, 2010

(54) HEURISTIC BEHAVIOR PATTERN MATCHING OF DATA FLOWS IN ENHANCED NETWORK TRAFFIC CLASSIFICATION

(75) Inventors: Weng-Chin Yung, Folsom, CA (US); Mark Hill, Los Altos, CA (US); Anne Cesa Klein, Cupertino, CA (US)

(73) Assignee: Packeteer, Inc., Cupertino, CA (US)

( * ) Notice: Subject to any disclaimer, the term of this patent is extended or adjusted under 35 U.S.C. 154(b) by 870 days.

(21) Appl. No.: 10/720,329

(22) Filed: Nov. 24, 2003

(51) Int. Cl.
*H04L 12/26* (2006.01)

(52) U.S. Cl. .................. 370/253; 370/235; 370/252; 709/224

(58) Field of Classification Search .................. 370/223, 370/224, 229, 230, 231, 236.1, 238, 235, 370/253, 252; 709/224, 226, 233, 235, 246
See application file for complete search history.

(56) References Cited

U.S. PATENT DOCUMENTS

| | | | |
|---|---|---|---|
| 4,914,650 A | 4/1990 | Sriram | |
| 5,828,846 A | 10/1998 | Kirby | |
| 6,003,077 A | 12/1999 | Bawden | |
| 6,023,456 A | 2/2000 | Chapman | |
| 6,038,216 A * | 3/2000 | Packer | 370/231 |
| 6,046,980 A * | 4/2000 | Packer | 370/230 |
| 6,122,670 A * | 9/2000 | Bennett et al. | 709/236 |
| 6,144,636 A * | 11/2000 | Aimoto et al. | 370/229 |
| 6,219,050 B1 | 4/2001 | Schaffer | |
| 6,285,660 B1 | 9/2001 | Ronen | |
| 6,363,056 B1 | 3/2002 | Beigi | |
| 6,397,359 B1 | 5/2002 | Chandra | |
| 6,584,467 B1 | 6/2003 | Haught | |
| 6,591,299 B2 * | 7/2003 | Riddle et al. | 709/224 |
| 6,625,648 B1 | 9/2003 | Schwaller | |
| 6,628,938 B1 | 9/2003 | Rachabathuni | |
| 6,681,232 B1 | 1/2004 | Sistanizadeh | |
| 6,690,918 B2 | 2/2004 | Evans | |
| 6,701,359 B1 | 3/2004 | Calabrez | |
| 6,738,352 B1 | 5/2004 | Yamada | |
| 6,798,763 B1 | 9/2004 | Kimura | |
| 6,894,972 B1 | 5/2005 | Phaal | |
| 7,010,611 B1 * | 3/2006 | Wiryaman et al. | 709/232 |
| 7,120,931 B1 | 10/2006 | Cheriton | |
| 7,154,416 B1 | 12/2006 | Savage | |
| 7,155,502 B1 | 12/2006 | Galloway | |
| 7,193,968 B1 | 3/2007 | Kapoor | |
| 7,215,637 B1 | 5/2007 | Ferguson | |
| 7,224,679 B2 | 5/2007 | Solomon | |

(Continued)

OTHER PUBLICATIONS

Pazos, C.M. et al., "Flow Control and Bandwidth Management in Next Generation Internets" IEEE, Jun. 22, 1998, pp. 123-132.*

(Continued)

*Primary Examiner*—Donald L Mills
(74) *Attorney, Agent, or Firm*—Baker Botts L.L.P.

(57) ABSTRACT

Methods, apparatuses and systems facilitating enhanced classification of network traffic that extends beyond analysis of explicitly presented packet attributes and holistically analyzes data flows, and in some implementations, related data flows against known application behavior patterns to classify the data flows. Implementations of the present invention facilitate the classification of encrypted or compressed network traffic, or where the higher layer information in the data flows are formatted according to a non-public or proprietary protocol.

31 Claims, 11 Drawing Sheets

U.S. PATENT DOCUMENTS

| | | |
|---|---|---|
| 7,292,531 B1 | 11/2007 | Hill |
| 7,296,288 B1 | 11/2007 | Hill |
| 7,324,447 B1 | 1/2008 | Morford |
| 7,385,924 B1 | 6/2008 | Riddle |
| 7,554,983 B1 | 6/2009 | Muppala |
| 2002/0122427 A1 | 9/2002 | Kamentsky |
| 2002/0143901 A1 | 10/2002 | Lupo |
| 2003/0035385 A1 | 2/2003 | Walsh |
| 2003/0112764 A1 | 6/2003 | Gaspard |
| 2003/0185210 A1 | 10/2003 | McCormack |
| 2004/0125815 A1 | 7/2004 | Shimazu |
| 2006/0045014 A1 | 3/2006 | Charzinski |

OTHER PUBLICATIONS

Ye, Guanhua et al., "Using explicit congestion notification in stream control transmisson provided in networks", IEEE, May 19-22, 2003, pp. 704-709.*

Yung, U.S. Appl. No. 10/917,952, entitled: Examination of connection handshake to enhance classification of encrypted network traffic, Aug. 2004.

* cited by examiner

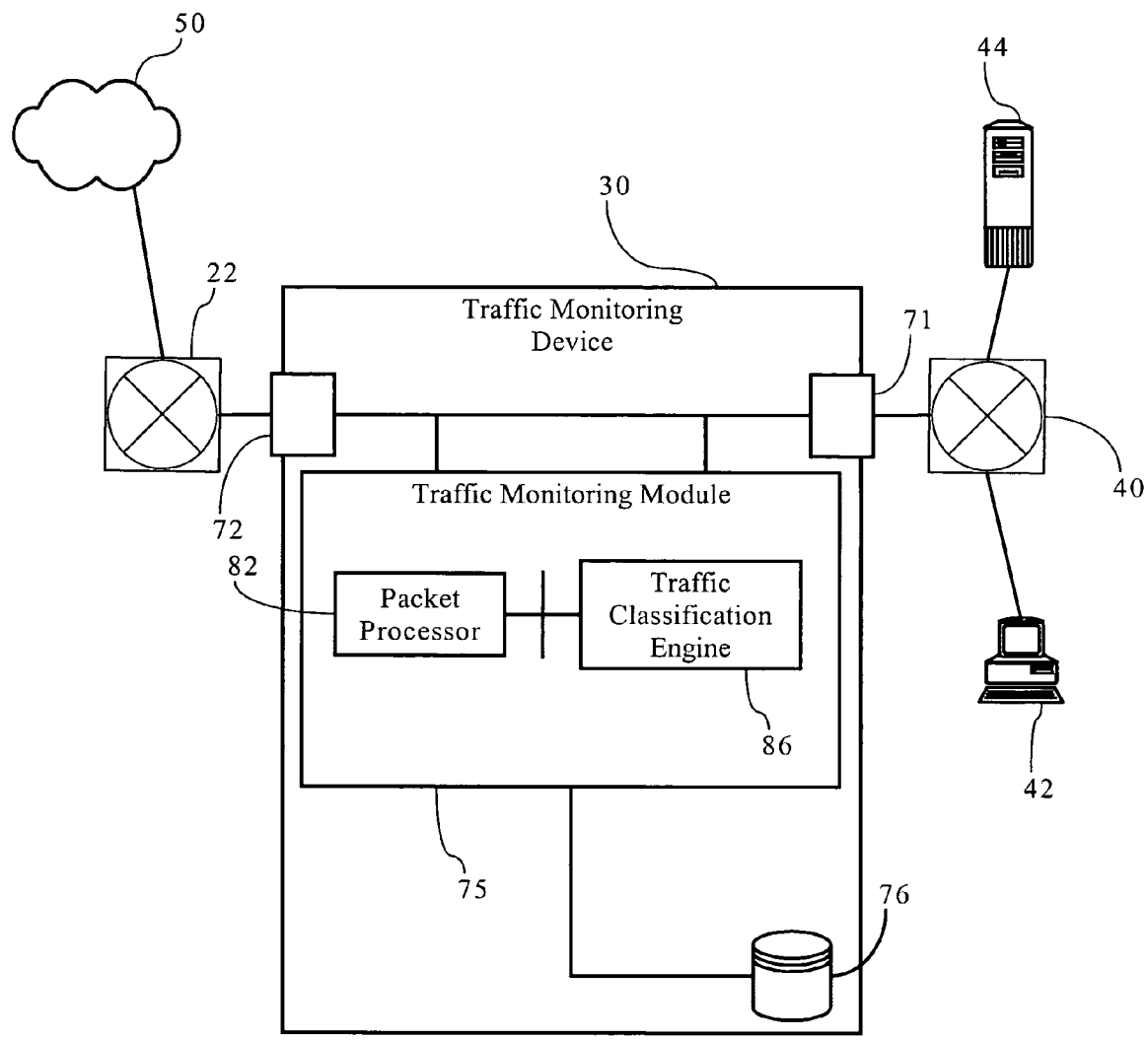
Fig._1

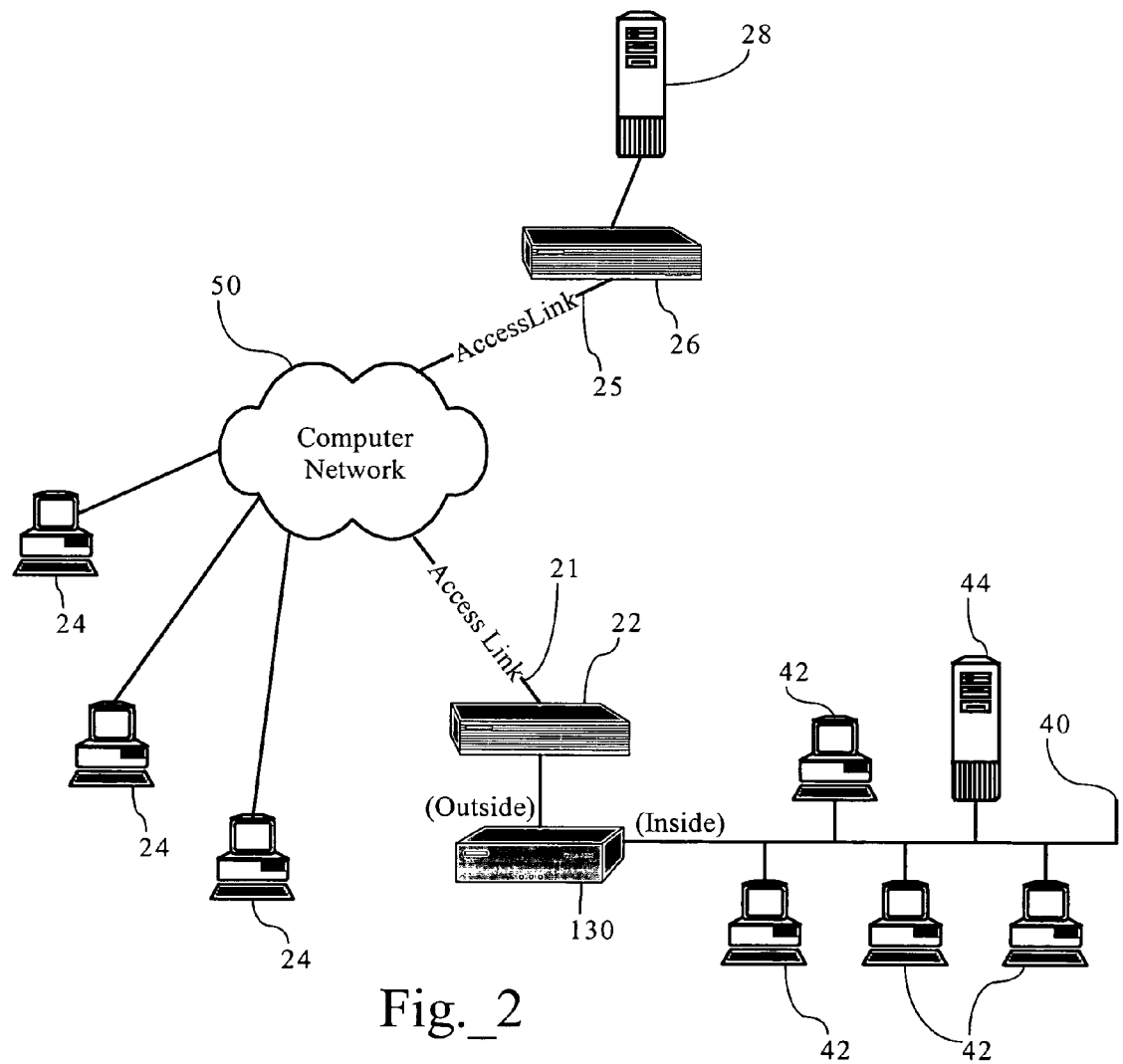
Fig._2

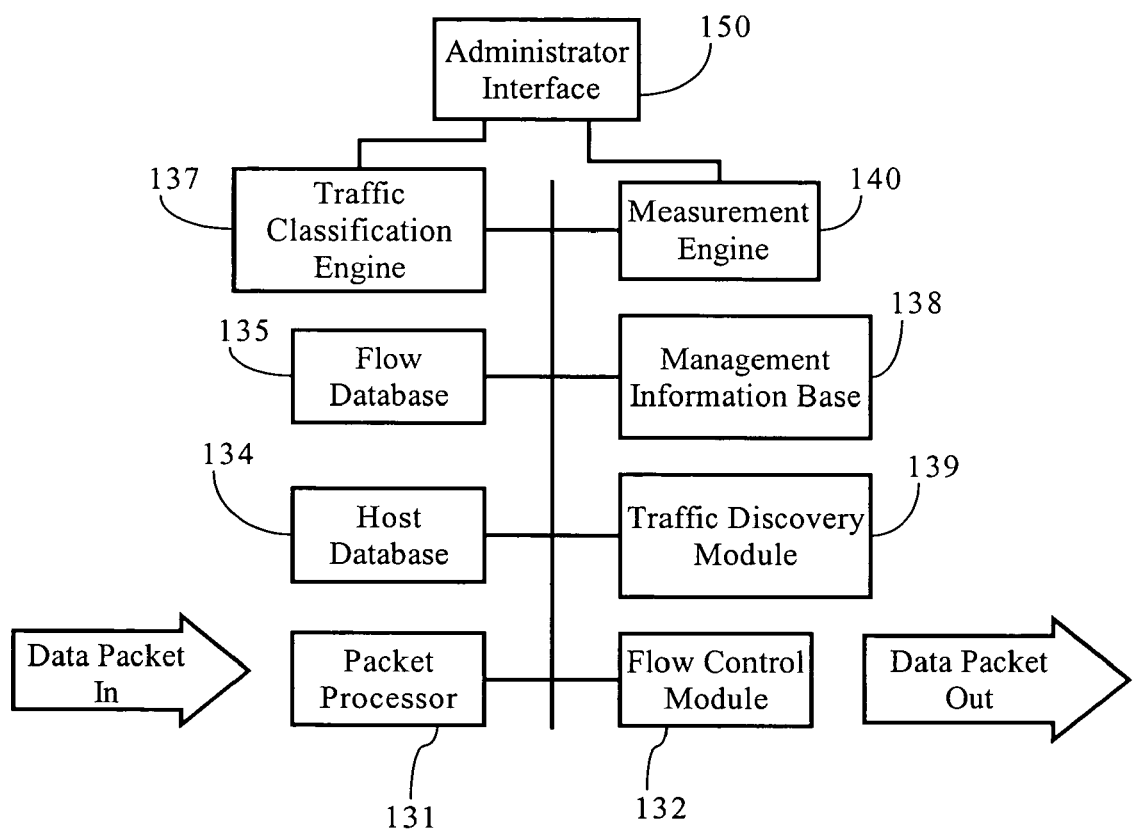
Fig._3

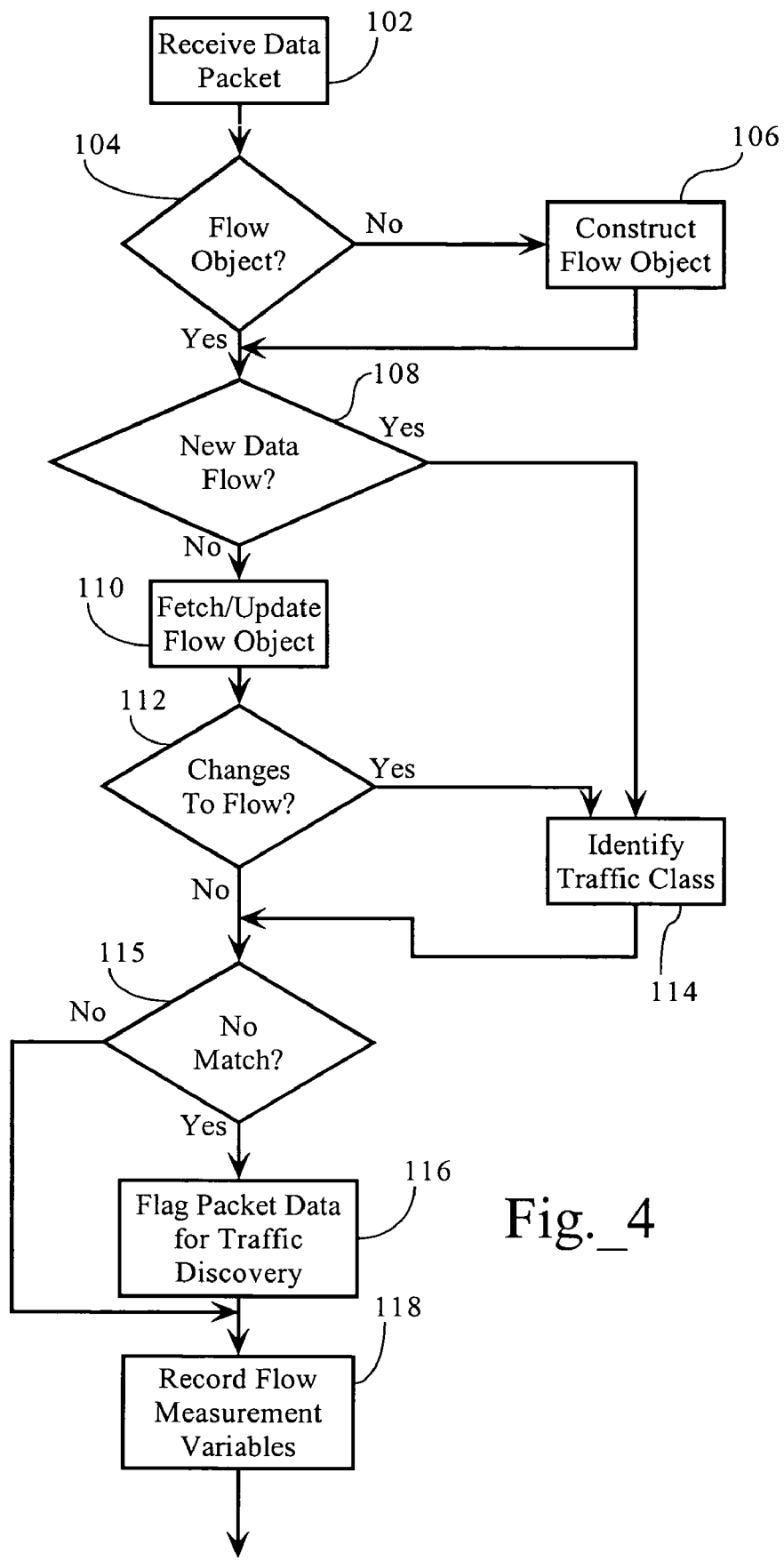
Fig._4

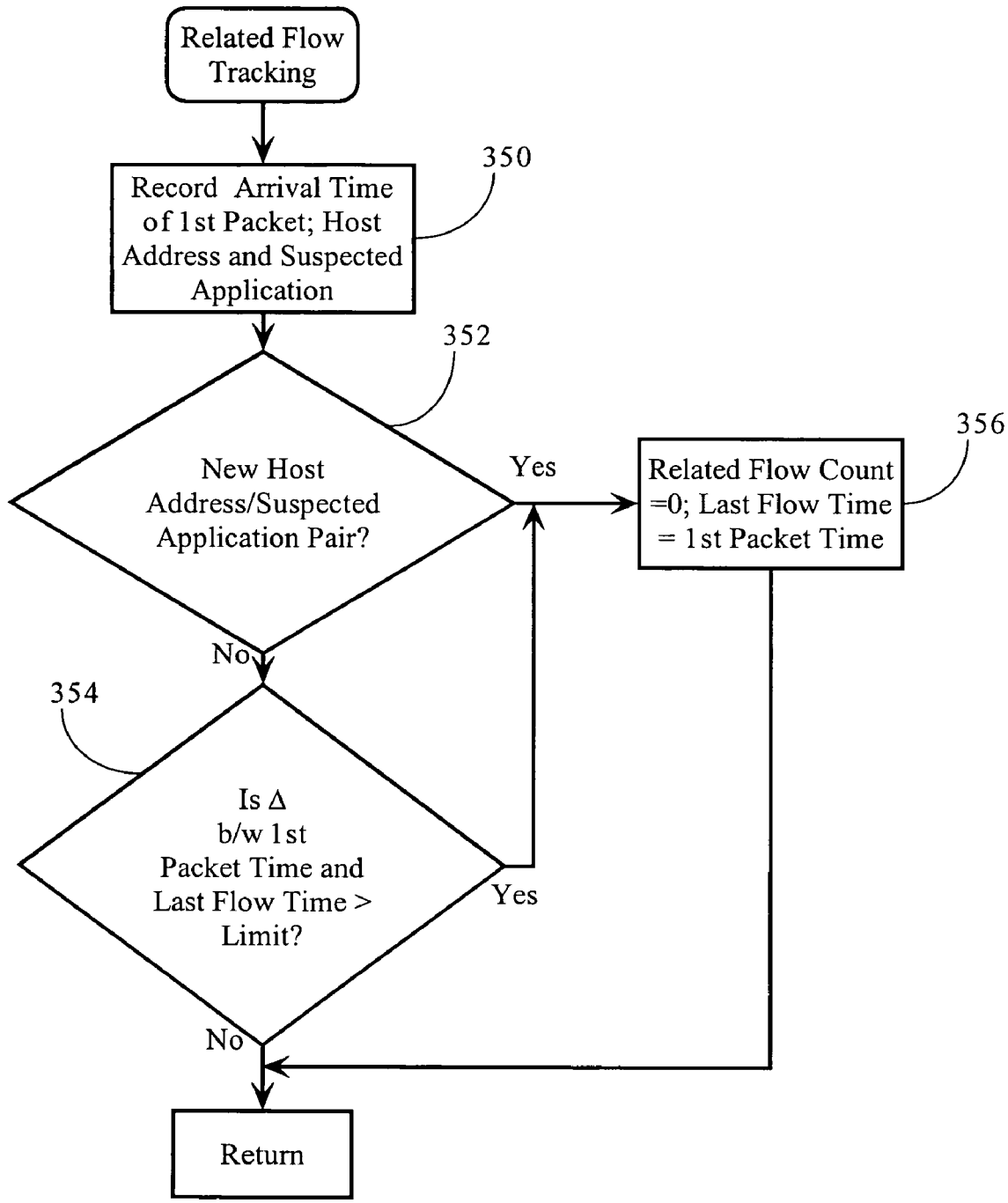
Fig._5C

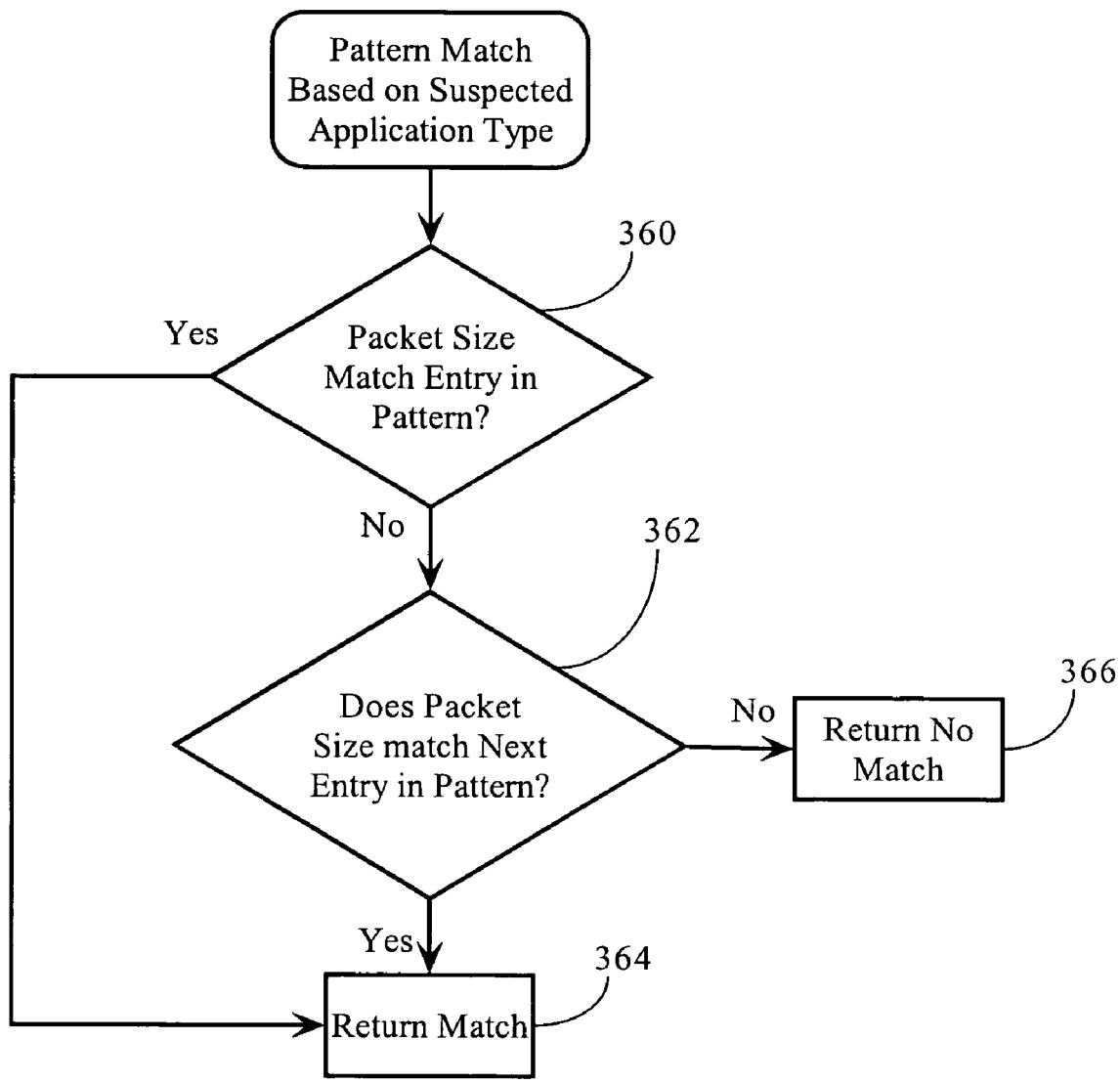
Fig._5D

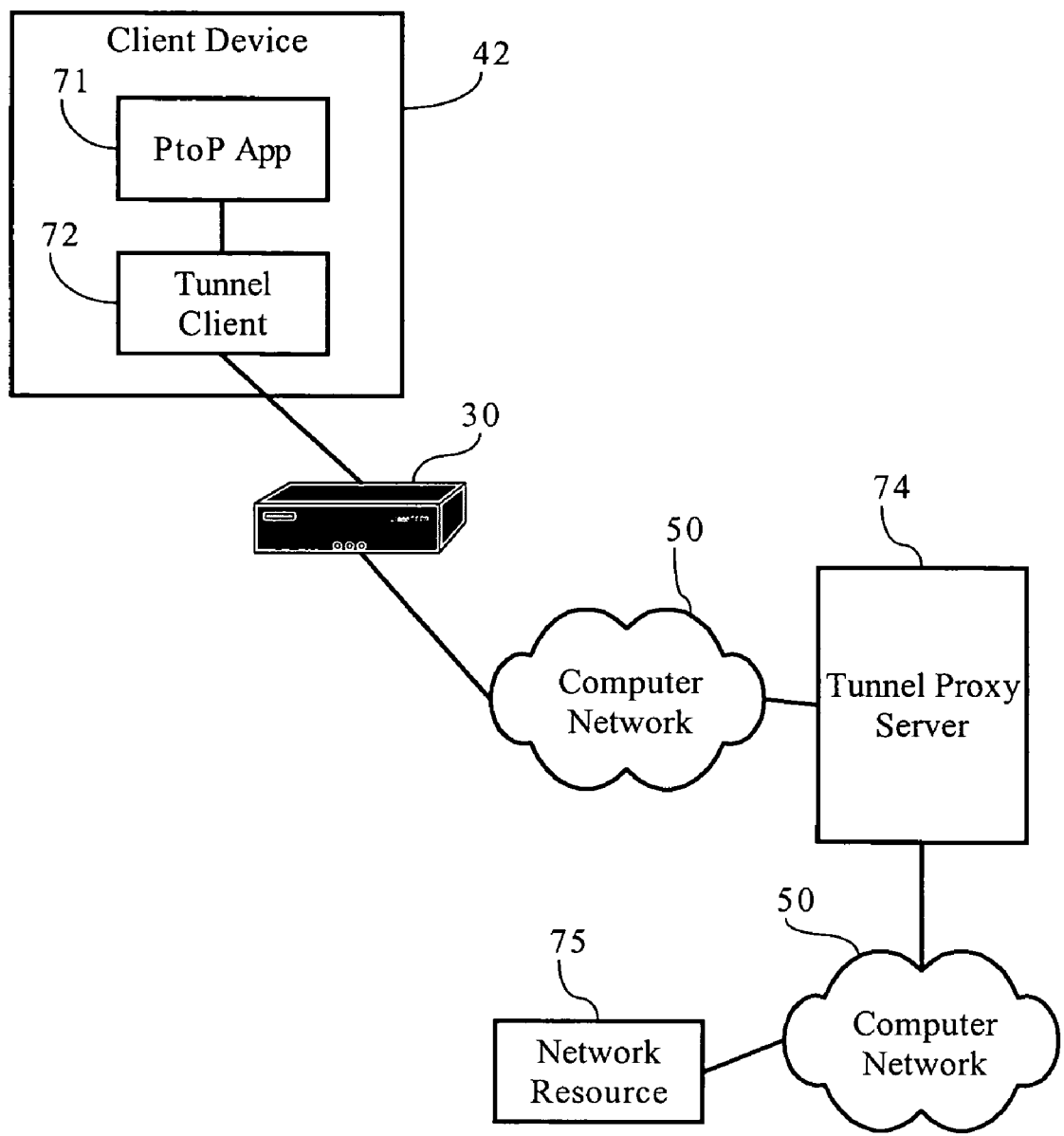
Fig._6

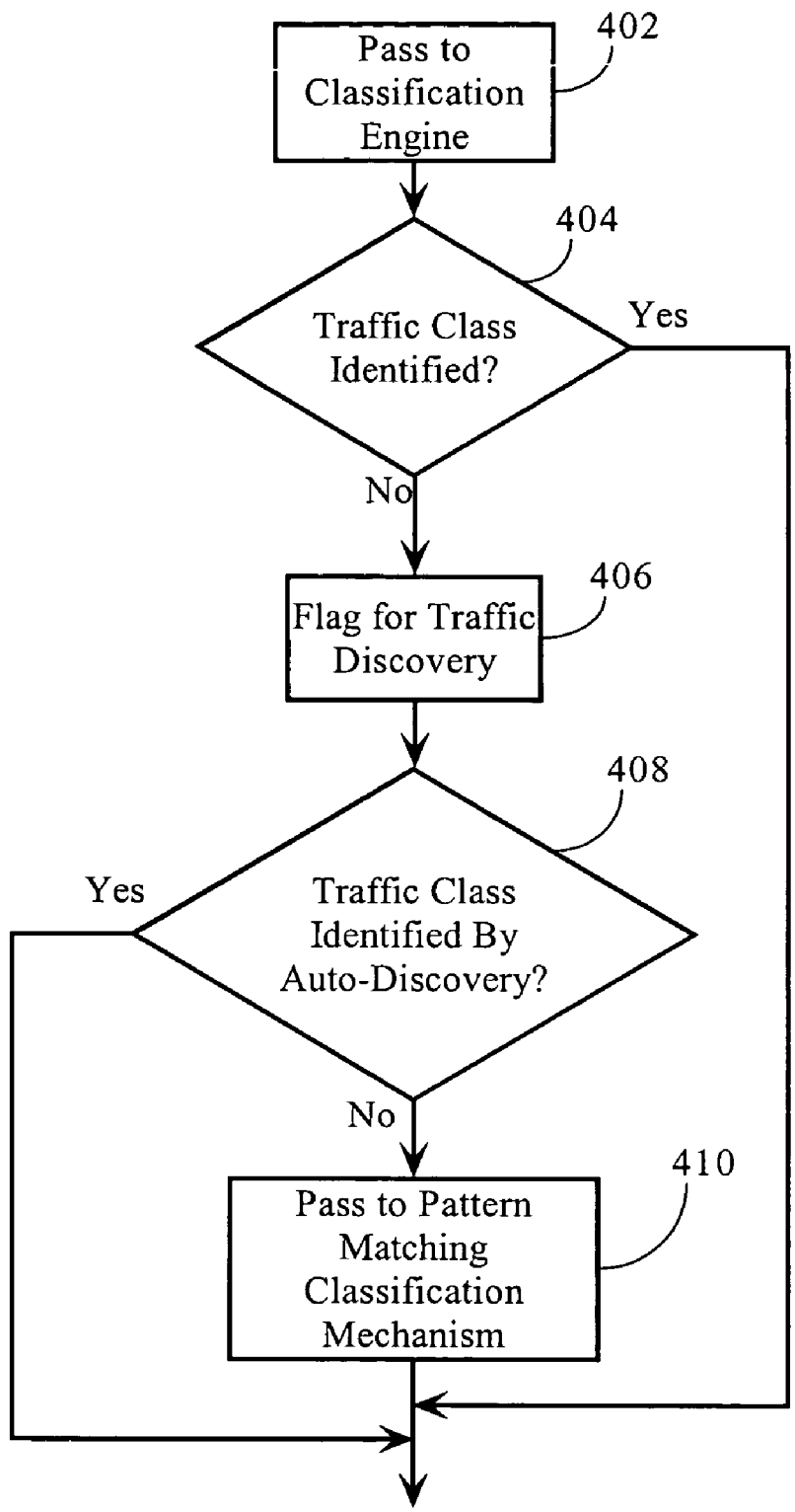
Fig._8

HEURISTIC BEHAVIOR PATTERN MATCHING OF DATA FLOWS IN ENHANCED NETWORK TRAFFIC CLASSIFICATION

CROSS-REFERENCE TO RELATED APPLICATIONS AND PATENTS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/295,391, in the name of Mark Hill, Guy Riddle and Robert Purvy, entitled "Methods, Apparatuses, and Systems Allowing for Bandwidth Management Schemes Responsive to Utilization Characteristics Associated with Individual Users;"

U.S. patent application Ser. No. 10/334,467, in the name of Mark Hilt, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;" and U.S. patent application Ser. No. 10/611,573, in the name of Roopesh Varier, David Jacobson, and Guy Riddle, entitled "Network Traffic Synchronization Mechanism."

FIELD OF THE INVENTION

The present invention relates to computer networks and, more particularly, to enhanced network traffic classification mechanisms that allow for identification of encrypted data flows, or data flows where attributes necessary to proper classification are otherwise obscured or unknown.

BACKGROUND OF THE INVENTION

Efficient allocation of network resources, such as available network bandwidth, has become critical as enterprises increase reliance on distributed computing environments and wide area computer networks to accomplish critical tasks. The widely-used Transport Control Protocol (TCP)/Internet Protocol (IP) protocol suite, which implements the worldwide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In order to understand the context of certain embodiments of the invention, the following provides an explanation of certain technical aspects of a packet based telecommunications network environment. Internet/Intranet technology is based largely on the TCP/IP protocol suite. At the network level, IP provides a "datagram" delivery service—that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a window which by its sliding operation essentially limits the amount of unacknowledged transmit data that a transmitter is allowed to emit. Another flow control mechanism is a congestion window, which is a refinement of the sliding window scheme involving a conservative expansion to make use of the full, allowable window.

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a Wide Area Network (WAN) link. In addition, routers can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data lows according to traffic classifications. In addition, certain bandwidth management devices, as well as certain routers, allow network administrators to specify aggregate bandwidth utilization controls to divide available bandwidth into partitions. With some network devices, these partitions can be configured to ensure a minimum bandwidth and/or cap bandwidth as to a particular class of traffic. An administrator specifies a traffic class (such as File Transfer Protocol (FTP) data, or data flows involving a specific user) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing the access link and further dividing the parent partitions into one or more child partitions. While the systems and methods discussed above that allow for traffic classification and application of bandwidth utilization controls on a per-traffic-classification basis operate effectively for their intended purposes, they possess certain limitations. As discussed more fully below, identification of traffic types associated with data flows traversing an access link involves the application of matching criteria or rules to explicitly presented or readily discoverable attributes of individual packets against an application signature which may comprise a protocol identifier (e.g., TCP, HyperText Transport Protocol (HTTP), User Datagram Protocol (UDP), Multipurpose Internet Mail Extensions (MIME) types, etc.), a port number, and even an application-specific string of text in the payload of a packet. After identification of a traffic type corresponding to a data flow, a bandwidth management device associates and subsequently applies bandwidth utilization controls (e.g., a policy or partition) to the data flow corresponding to the identified traffic classification or type. Accordingly, simple changes to an application, such as a string of text appearing in the payload or the use of encryption text may allow the application to evade proper classification and corresponding bandwidth utilization controls or admission policies.

Indeed, a common use of bandwidth management devices is to limit the bandwidth being consumed by unruly, bandwidth-intensive applications, such as peer-to-peer applications (e.g., Kazaa, Napster, etc.), and/or other unauthorized applications. Indeed, the rich Layer 7 classification functionality of Packetshaper® bandwidth management devices offered by Packeteer®, Inc. of Cupertino, Calif. is an attractive feature for network administrator, as it allows for accurate identification of a variety of application types. This traffic classification functionality, in many instances, uses a combination of known protocol types, port numbers and application-specific attributes to differentiate between various application traffic traversing the network. An increasing number of such peer-to-peer applications, however, employ data compression, encryption technology, and/or proprietary protocols that obscure or prevent identification of various application-specific attributes, often leaving well-known port numbers as the only basis for classification. In fact, as networked applications get increasingly complicated, data encryption has become a touted feature. Indeed, encryption addresses the concern of security and privacy issues, but it also makes it much more difficult to identify unauthorized applications using encryption, such as the peer-to-peer applications "Earthstation 5" and "Winny." In addition, traffic classification based solely on well-known port numbers can be problematic, especially where the application uses dynamic port number assignments or an application incorrectly uses a well-known port number, leading to misclassification of the data flows. In addition, classifying such encrypted network traffic as "unknown" and applying a particular rate or admission policy to unknown traffic classes undermines the granular control otherwise provided by bandwidth management devices and, further, may cause legitimate, encrypted traffic to suffer as a result.

In addition, network savvy users (such as students in a campus or university environment) have also become aware that bandwidth management devices have been deployed to limit or restrict unauthorized peer-to-peer application traffic. As a result, users often attempt to bypass or thwart the bandwidth management scheme effected by such bandwidth management devices by creating communications tunnels (proxy tunnels) through which unauthorized or restricted network traffic is sent. The attributes discernible from the content of these tunneled data flows, however, often reveal little information about its true nature. For example, commercial HTTP tunnel services (such as loopholesoftware.com, TotalRc.net, and http-tunnel.com, etc.) allow users to send all network traffic in the form of HTTP traffic through a HTTP tunnel between a tunnel client and an HTTP proxy server maintained by the tunnel services provider. FIG. 6 illustrates the functionality and operation of a typical HTTP proxy tunnel. Client device 42 includes a client application (such as a peer-to-peer application 71) and a tunnel client 72. The client application sends data to the tunnel client 72 which tunnels the data over HTTP to a tunnel proxy server 74. The tunnel proxy server 74 then forwards the data to the intended destination (here, network resource 75), and vice versa. Such HTTP tunnels typically feature encryption; accordingly, a bandwidth management device 30, encountering the tunneled traffic in this form, may not detect the exact nature of the traffic and, in fact, classify such data flows as legitimate or regular HTTP traffic. Accordingly, these tunneling mechanisms and other techniques for evading bandwidth utilization controls implemented by bandwidth management devices present new challenges to network administrators and bandwidth management device manufacturers desiring to effectively control unauthorized or restricted network traffic.

In light of the foregoing, a need in the art exists for methods, apparatuses and systems that facilitate the classification of encrypted or compressed network traffic. A need further exists for methods, apparatuses and systems that facilitate the classification of network traffic associated with a non-public, proprietary protocol or application. Embodiments of the present invention substantially fulfill these needs.

SUMMARY OF THE INVENTION

The present invention provides methods, apparatuses and systems facilitating enhanced classification of network traffic. As discussed above, typical mechanisms that classify network traffic analyze explicitly presented or readily discoverable attributes of individual packets against an application signature, such as a combination of protocol identifiers, port numbers and text strings. The present invention extends beyond analysis of such explicitly presented packet attributes and holistically analyzes the data flows, and in some implementations, the behavior of host or end systems as expressed in related data flows against known application behavior patterns to classify the data flows. Implementations of the present invention facilitate the classification of encrypted or compressed network traffic, or where the higher layer information in the data flows are formatted according to a non-public or proprietary protocol. In one embodiment, the enhanced classification functionality analyzes the behavioral attributes of encrypted data flows against a knowledge base of known application behavior patterns to classify the data flows. In one embodiment, the enhanced classification mechanisms described herein operate seamlessly with other Layer 7 traffic classification mechanisms that operate on attributes of the packets themselves. Implementations of the present invention can be incorporated into a variety of network devices, such as traffic monitoring devices, packet capture devices, firewalls, and bandwidth management devices.

DESCRIPTION OF THE DRAWINGS

FIG. 1 is a functional block diagram showing a traffic monitoring device according to an embodiment of the present invention.

FIG. 2 is a functional block diagram illustrating a computer network environment including a bandwidth management device according to an embodiment of the present invention.

FIG. 3 is a functional block diagram setting forth the functionality in a bandwidth management device according to an embodiment of the present invention.

FIG. 4 is a flow chart diagram providing a method, according to an embodiment of the present invention, directed to the processing of packets in a traffic monitoring device.

FIGS. 5A thru 5D are flow chart diagrams illustrating methods, according to an embodiment of the present invention, directed to classifying data flows based on one or more observed behavioral attributes.

FIG. 6 is a functional block diagram illustrating a proxy tunnel which may be used in attempts to evade appropriate classification and circumvent the bandwidth utilization controls implemented by bandwidth management devices.

FIG. 8 is a flow chart diagram showing how the application behavior pattern matching functionality can be applied in combination with other network traffic classification processes.

DESCRIPTION OF PREFERRED EMBODIMENT(S)

Figure 5A:
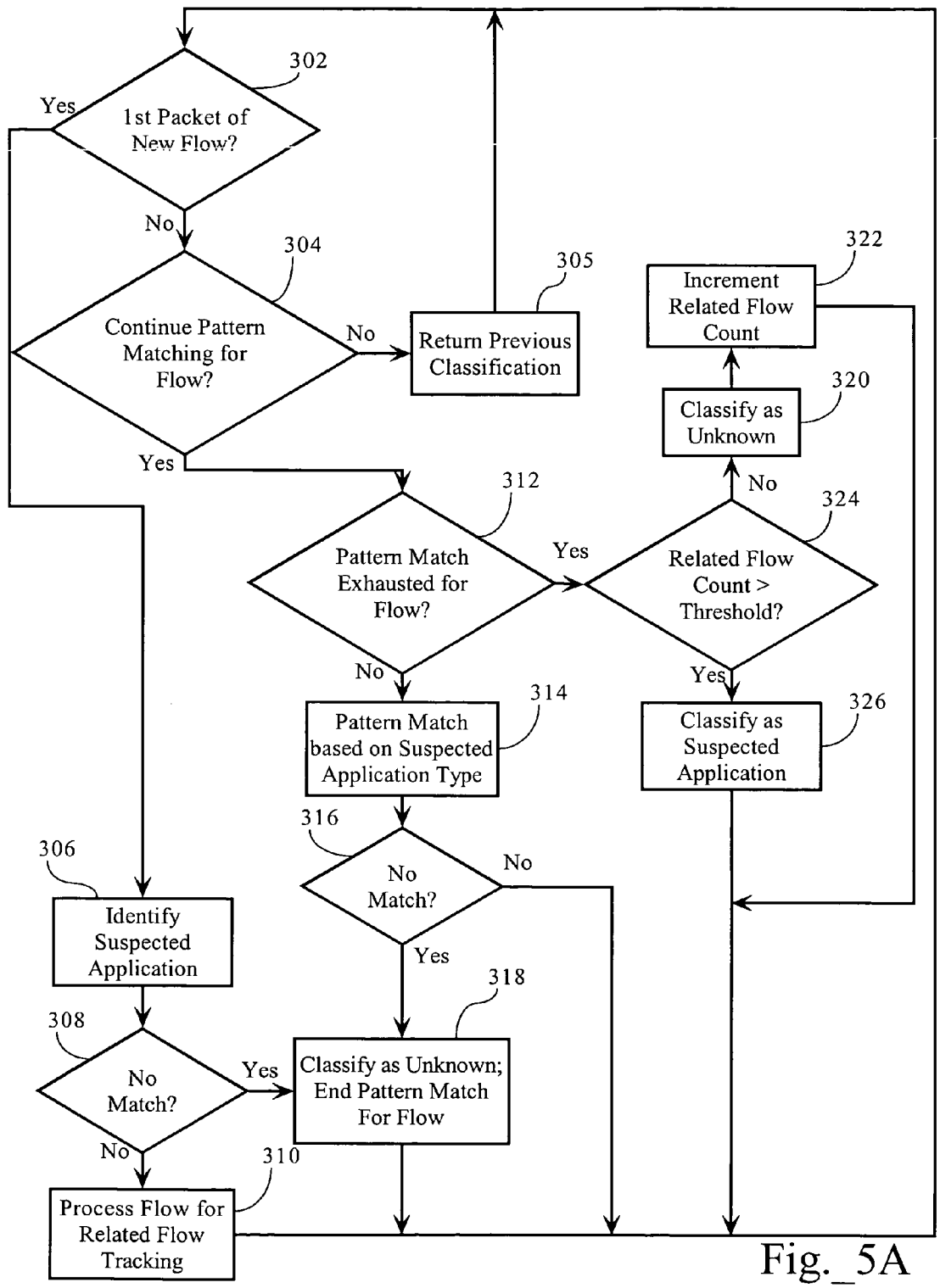

FIG. 1 illustrates a basic network environment in which an embodiment of the present invention operates. FIG. 1 shows a first network device 40 (such as a hub, switch, router, and/or a variety of combinations of such devices implementing a LAN or WAN) interconnecting two end-systems (here, client computer 42 and server 44). FIG. 1 also provides a second network device 22, such as a router, operably connected to network cloud 50, which in one implementation could be an open, wide-area network. As FIG. 1 shows, traffic monitoring device 30 comprises traffic monitoring module 75, and first and second network interfaces 71, 72, which operably connect traffic monitoring device 30 to the communications path between first network device 40 and second network device 22. Traffic monitoring module 75 generally refers to the functionality implemented by traffic monitoring device 30. In one embodiment, traffic monitoring module 75 is a combination of hardware and software, such as a central processing unit, memory, a system bus, an operating system and one or more software modules implementing the functionality described herein. In one embodiment, traffic monitoring module 75 includes a packet processor 82, and a traffic classification engine 86. In one embodiment, the packet processor 82 is operative to process data packets, such as storing packets in a buffer structure, detecting new data flows, and parsing the data packets for various attributes (such as source and destination addresses, and the Like) and maintaining one or more measurement variables or statistics in connection with the flows. The traffic classification engine 86, as discussed more fully below, is operative to classify data flows based on one or more attributes associated with the data flows. Traffic classification engine 86 is also operative to classify data flows based on a heuristic comparison of certain observed behavioral attributes of the data flows relative to a set of at least one known application behavior pattern.

The functionality of traffic monitoring device 30 can be integrated into a variety of network devices that classify network traffic, such as firewalls, gateways, proxies, packet capture devices (see U.S. application Ser. No. 10/453,345), network traffic monitoring and/or bandwidth management devices, that are typically located at strategic points in computer networks. In one embodiment, first and second network interfaces 71, 72 are implemented as a combination of hardware and software, such as network interface cards and associated software drivers. In addition, the first and second network interfaces 71, 72 can be wired network interfaces, such as Ethernet interfaces, and/or wireless network interfaces, such as 802.11, BlueTooth, satellite-based interfaces, and the like. As FIG. 1 illustrates, traffic monitoring device 30, in one embodiment, includes persistent memory 76, such as a hard disk drive or other suitable memory device, such writable CD, DVD, or tape drives.

As FIGS. 1 and 2 show, the traffic monitoring device 30 (or bandwidth management device 130), in one embodiment, is disposed on the link between a local area network 40 and router 22. In other embodiments, multiple traffic monitoring devices can be disposed at strategic points in a given network infrastructure to achieve various objectives. In addition, traffic monitoring device 30 need not be directly connected to the link between two network devices, but may also be connected to a mirror port. In addition, the traffic monitoring functionality described herein may be deployed in multiple network devices and used in redundant network topologies by integrating the network traffic synchronization functionality described in U.S. application Ser. No. 10/611,573, incorporated by reference above.

A. Network Traffic Monitoring and Enhanced Traffic Classification

As discussed herein, traffic monitoring device 30 is operative to detect or recognize flows between end systems or hosts, and classify the data flows based on one or more flow and/or behavioral attributes. Traffic monitoring device 30 may also monitor and store one or more measurement variables on an aggregate and/or per-traffic-class basis. As discussed below, traffic monitoring device 30 may also be operative to identify or discover the traffic classes corresponding to data flows traversing an access link and add them to the configuration of traffic classification engine 86. As discussed above, traffic discovery allows network administrators to determine the nature of the data flows encountered on a given network. U.S. Pat. Nos. 6,412,000 and 6,457,051 disclose methods and systems that automatically classify network traffic according to a set of classification attributes. In addition, the tracking of measurement variables (such as total throughput, peak or average bandwidth usage, etc.) allows the network administrator to determine the relative significance of the existing traffic classes, as well as newly-discovered traffic, on bandwidth utilization across the access link.

FIG. 4 illustrates a method, according to an embodiment of the present invention, directed to a flow-aware process that classifies flows and maintains one or more measurement variables based on the identified traffic class. As FIG. 4 illustrates, a packet processor 82 receives a data packet (102) and determines whether a flow object has already been created for the flow to which the data packet is a part (104). A flow object, in one implementation, is a data structure including fields whose values characterize various attributes of the flow, including source and destination IP addresses, port numbers, traffic class identifiers and the like. A flow object can also include other attributes, such as packet count, byte count, first packet time, last packet time, etc. If a flow object is not found, packet processor 82 constructs a new flow object (106). Packet processor 82 then determines whether the received packet is part of an existing flow or a new data flow (108). In one embodiment, flows are generally TCP and UDP flows. However, any suitable transport layer flow can be recognized and detected. In one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, packet processor 82 can determine a new data flow by detecting SYN and/or SYN/ACK packets. However, a new data flow can simply be a data flow for which there is no corresponding flow object. For example, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another implementation, a background and/or separate process can periodically compare the Last packet times associated with a flow to a threshold period of time and deem the flow terminated if the last packet time is beyond the threshold period of time.

If the packet is part of an existing flow, the packet processor 82 associates the packet with the corresponding flow object and updates flow object attributes as required (110). For example, the packet processor 82, in one embodiment, increments the packet count associated with the flow (116). If the packet represents a new data flow, traffic classification engine 86 operates on the flow object and, potentially, attributes of the packet and other packets associated with the flow to determine a traffic type and/or traffic class associated with the flow (114). In one embodiment, the packet (or a pointer to the packet stored in a buffer structure) and the flow object (or a pointer thereto) is passed to the traffic classification engine 86 to determine a traffic class. As discussed in more detail below, identification of a traffic class or type can employ information gleaned from Layers 2 thru 7 of the OSI reference model. The determination of traffic classes is discussed in more detail below at Sections B.1. and B.3. Similarly, if the packet represents a change to the data flow (112), packet processor 82 passes the packet and flow object to the traffic classification engine 86 to determine the traffic class. As FIG. 4 shows, if the data flow does not match an existing traffic class (115), packet processor 82 or traffic classification engine 86 flags the packet for traffic discovery (116). In one embodiment, a data flow that does not match an existing traffic class is classified in the default traffic class. Packet processor 82 or another module then records or updates various measurement variables, such as packet count, byte count, last packet time and the like (118). As discussed above, traffic monitoring device 30 may perform other operations, such as firewall or gateway operations, packet capture operations, and/or bandwidth management functions.

Traffic discovery module 84, in one implementation, operates concurrently with the processing of data flows as described above to discover new traffic classes and add the newly discovered traffic classes to traffic classification engine 86. Traffic discovery module 84, in one implementation operates on packets that have been flagged or otherwise associated with a default traffic class. In one implementation, traffic discovery module 84 automatically discovers traffic classes based on the methods and systems described in U.S. Pat. Nos. 6,412,000, 6,457,051, and 6,591,299 (see above). For example, traffic discovery module 84 can monitor data flows in real time to discover traffic classes in the data flows, or store flagged packets and process the stored packets periodically to discover new traffic classes. As discussed in the above-identified patents, traffic discovery module 84 applies one or more discovery thresholds, such as a minimum byte count, flow count, packet count and the like with or without respect to a fixed or sliding time window in determining whether to add a newly discovered traffic class to traffic classification engine 86.

A.1. Traffic Classification and Flow Behavior Pattern Matching

Traffic classification engine 86, in one implementation, is operative to classify data flows on two different frameworks. That is, traffic classification engine 86 is operative to classify traffic, according to a first framework, based on attributes of individual packets of the data flows that are readily discoverable or unconcealed by encryption or compression. If a data flow is not classified applying this first framework, traffic classification engine 86 applies a second traffic classification framework that, as discussed herein, involves a heuristic matching of the behavioral attributes of data flows to one or more known application behavior patterns. Of course, other arrangements are possible. For example, the second traffic classification framework could be applied exclusively, or at least before the first classification framework. The arrangement described above is preferred, in certain implementations, as the majority of network traffic is non-encrypted or can otherwise be classified based on non-concealed data flow attributes. Accordingly, the heuristic behavior pattern matching described below is applied only in cases where the extra processing is required.

According to this first framework, a traffic class has at least one attribute defining the criterion(ia) against which data flow attributes are analyzed for the purpose of determining a matching traffic class. For example, a traffic class can be defined by configuring an attribute defining a particular well-known port number in combination with other attributes. Of course, a particular traffic class can be defined in relation to a variety of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, traffic classification engine 86 includes functionality allowing for classification of network traffic based on information from layers 2 to 7 of the OSI reference model. Traffic classification engine 86, in one embodiment, stores the traffic classes and corresponding data (e.g., matching rules, policies, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. In one embodiment, the root traffic classifications are "/inbound/" and "/outbound/" data flows. As discussed in U.S. application Ser. No. 10/334,467, traffic classification engine 86, in one implementation, is configured to traverse the hierarchical traffic classification tree, applying the matching rules associated with each traffic class node, in the order in which they are configured. In one embodiment, traffic classification engine 86 attempts to match to a leaf traffic class node before proceeding to remaining traffic class nodes in the hierarchical configuration. If a traffic class is found, the traffic classification database 137 stops the instant search process and returns the identified traffic classification. Any data flow not explicitly classified is classified as "/inbound/default/" or "/outbound/default/". Of course, one skilled in the art will recognize that alternative ways for traversing the hierarchical traffic class configuration can be implemented.

In one implementation, traffic classification engine 86 applies the heuristic behavior pattern matching functionality described herein to data flows classified as /inbound/default/ or /outbound/default/. With the content of data packets beyond the transport layer being obscured by encryption or compression algorithms, analyzing data flows against an application profile is almost impossible without knowledge of the cryptographic keys; however, data flows may nevertheless be classified by observing the behavior of an application residing on a given host, such as how the host behaves at startup and how the host exchanges packets with its peers. Of course, the behavior of an application at other phases (such as data transfer, peer discovery, registration, etc.) can also be modeled and used for purposes of classification. In one implementation, the behavior pattern matching functionality employs a selection of one to a combination of the following techniques or factors to classify compressed or encrypted data flows:

1) Discoverable Protocol Type—In one implementation, discoverable attributes of the packets associated with a data flow are first used to identify or rule out possible applications or traffic classes. For example, that the data flow is a TCP flow or a UDP flow can be used to identify or rule out a pool of suspected applications or traffic classes.

2) Packet Size Matching—In one implementation, when studying the behavior of a given application it can sometimes be determined that the host application emits or receives data flows where the size of the packets exhibits a consistent pattern. For example, the peer-to-peer file sharing application, Winny, at startup attempts to discover one or more peers. This discovery process results in a plurality of data flows where the first packet is a given size, or at least within a narrow size range. The second and subsequent packets exhibit the same patterns as well. By observing this behavior, a knowledge base including these heuristic findings can be used to compile one or more application behavior pattern(s) for use in classifying data flows. For example, an application behavior pattern may specify the expected size of the first n (e.g., 3) packets in a data flow. To avoid the packet size pattern matching become immediately obsolete when new application releases introduced, minor size variations may be allowed when determining a matching pattern. In addition, as the following flow charts address, packets in a flow may arrive out of order at traffic monitoring device 30, implementations of the behavior pattern functionality adapt to these situations by looking to subsequent the packet sizes in the behavior pattern.

3) Entropy Calculation—The observed entropy of a data flow or portion thereof can also be used for traffic classification. An entropy value, in one implementation, is a parameter used to evaluate the information density of a file or chunk of binary data, such as a packet. A very high information density (e.g., an entropy value exceeding a threshold) can indicate that the information is essentially random or encrypted. Several well-known algorithms can be used to compute an entropy value for a given packet or group of packets, such as Entropy algorithm1, Chi-square Test2, Monte Carlo Value for Pi3, Arithmetic Mean4, and Serial Correlation Coffieient5. Of course, any suitable algorithm for computing the information density of a block of binary data can be used. As discussed below, in one implementation, the information density for the first packet in the flow is analyzed. However, in other implementations, the information density of subsequent packets can be analyzed in addition to, or in lieu of, the first packet. Still further, the entropy value computation may be a composite value or set of values, resulting from the application of a plurality of algorithms. For example, the application behavior pattern may include entropy values or ranges for two different algorithms, since the algorithms are unique and will produce different values. Accordingly, a data flow can be classified, at least in part, by how closely one or more packets track the values in the application behavior pattern. Still further, the entropy value can be computed with respect to portions of individual packets, such as the first n bytes.

4) Inter flow Timing—The timing between a current flow and a previous flow, both associated with a given host can also be used to classify the current flow. For example, a Winny peer at start up typically attempts to discover multiple peers, resulting in multiple data flows spaced closely in time. Accordingly, if the interval between a current flow and a previous flow suspected as Winny traffic exceeds a maximum interval time, these two flows will not be deemed concurrent or part of the same application traffic.

5) Related Flow Characterization—In one implementation, the number of related data flows associated with a suspected application can also be used in behavior pattern matching. In one implementation, a minimum number of suspected application flows must be encountered before traffic classification engine 86 decides to classify the otherwise unknown flows as the suspected application. In one implementation, traffic classification engine 86 keeps track of the total number of suspected application flows associated with a given host. While keeping track of this number, traffic classification engine 86 resets this total if the 'inter flow timing' (above) exceeds the limit associated with the behavior pattern of the suspected application.

Of course, the application behavior pattern can incorporate other factors as well. For example, the application behavior pattern may include required time values or ranges for the timing between packets in a given flow. Still further, the entropy computation discussed above can be applied to an entire data flow, or in the aggregate, to a group of related flows. In addition, the application behavior pattern may specify size requirements for a group of related data flows. For example, an application behavior pattern may specify a first size range (e.g., in bytes) for a first suspected application flow, and a second size range for a second related flow, and so on.

Still further, the application behavior pattern may include a specification of the sequence, direction, and/or timing of various protocol identifiers or flags. For example, an application behavior pattern may include a sequence and timing specification of certain TCP flags (such as SYNs, ACKs, FINs, RSTs, etc.) that should be encountered during a data flow or sequence of data flows in order to match a suspected traffic class.

In addition, the application behavior pattern may also indicate whether one or more packets in a data flow include invalid checksum values. It has been found that certain peer-to-peer applications include invalid checksum values in the headers, such as TCP headers, or other higher layer headers, such as the application layer. Accordingly, the traffic classification engine 137 can be configured for selected packets in a data flow to verify the validity of the corresponding checksum value and use the determined validity or invalidity to match the data flow against an application behavior pattern. In addition, an application behavior pattern can be configured to specify which packets in a data flow (e.g., the first, fifth, etc.) should contain a valid or invalid checksum value.

FIGS. 5A thru 5D illustrate methods directed to the classification of data flows using heuristic application behavior pattern matching according to an embodiment of the present invention. One skilled in the art will recognize that the methods described below represent only one of a variety of possible embodiments. As the Figures illustrate, the application behavior pattern matching, according to one implementation, identifies a suspected application (i.e., traffic class) based on examination of the first packet and analyzes subsequent packets in the data flow, as welt as related data flows, to ultimately make a traffic classification determination. In other implementations, a pool of suspected applications can be identified from the first packet with examination of subsequent packets and the relationship between other suspected flows gradually narrowing the pool until a suspected application is confirmed or alt suspected applications are ruled out.

Specifically, as FIG. 5A illustrates, if the packet is the first packet received for a flow (302), traffic classification engine 86 processes the packet to identify a suspected application based on one or more attributes of the packet (306) (see also FIG. 5B, and discussion below). If from the first packet, a suspected application is not identified (308), the data flow is classified as unknown (318). In one implementation, traffic classification engine 86 writes the "default" traffic class identifier into the flow object. Otherwise, if a suspected application is identified, traffic classification engine 86 processes the flow for purposes of performing pattern matching on subsequent packets associated with the flow, as well as tracking the flow relative to other suspected application flows (310) (see FIG. 3C).

As FIG. 3C illustrates, if a suspected application is identified, traffic classification engine 86 records the arrival time of the first packet in association with an identifier for the suspected application and an identifier for the host associated with the flow (350). Other variables stored in associated with the host address/suspected application pair include the last flow time and a related flow count. In one implementation, the pattern matching functionality described herein has a reserved memory space in a buffer structure for recording required data, such as flow state data, to track data flow behavior in suitable data structures, such as tables, hash tables and the like. In some instances, conventional traffic classification may often require observation of several packets in a flow to fully classify the data flow. According to certain implementations described herein, the pattern matching functionality would also be invoked at the beginning of such flows. Accordingly, in some implementations, the classification of a flow according to the first framework, above, triggers clean up of the data structures maintained by the pattern matching functionality described above. Other memory management techniques are also possible, such as over-writing the least-recently used memory space when available memory becomes depleted.

In one implementation, the IP address of the host is used to identify the host of interest. The host can either be the source or destination host depending on the suspected application type and the type of activity after which the pattern is modeled. For example, for an application behavior pattern modeling the startup phase of a peer-to-peer application residing on an "inside" host (see FIG. 2) where multiple discovery requests are transmitted, the source address is used. Of course, the destination address of flows responsive to the discovery requests can be used in other patterns. For other application types, both the source and destination address may be used. The suspected application identifier can be a unique number or arbitrary string that maps to a particular application name, or can simply be the application name itself.

In any event, traffic classification engine 86 then determines whether the host address/suspected application pair has been previously recorded in the buffer structure (352). If the host address/suspected application pair is new, traffic classification engine 86 sets a related flow count variable to zero and a last flow time to the arrival time of the first packet. Otherwise, if the host address/suspected application pair has been previously recorded, traffic classification engine 86 compares the difference between the last flow time (set as a result of the previous flow) and the arrival time of the $1^{st}$ packet in the current flow (354). If the difference is beyond a threshold value, the related flow count is reset and the last flow time is set to the arrival time of the $1^{st}$ packet in the current flow.

As FIG. 5A illustrates, subsequent packets in a suspected application flow meet decisional step 304 according to which traffic classification engine 86 decides whether pattern matching for the flow should continue. In the implementation described in the Figures, traffic classification engine 86 bases this decision on whether the flow object corresponding to the flow includes a traffic class identifier, such as default. This indicates that that a traffic class has been identified according to another process, or that the pattern matching functionality has identified a traffic class or determined that it cannot identify a traffic class (which causes it to write the "default" class identifier into the flow object). In either case further analysis of the data flow is useless and the previous traffic classification is returned (305). If pattern matching for a data flow continues, traffic classification engine 86 determines whether pattern matching for the flow has been exhausted, in one implementation, based on the packet count of the flow (312). For example, a pattern for a particular application may include packet size ranges and/or other attributes for the first n (e.g., 3 or 4) packets of a flow. If the first n packets of a flow match the criterion, no further analysis is necessary. If the packet count indicates that pattern matching has not been exhausted, traffic classification engine 86 determines whether the current packet matches the pattern associated with the suspected application (314) (see also FIG. 5D and discussion below). If the subsequent packet does not match the behavior pattern associated with the suspected application (316), the data flow is classified as unknown (318) which, as discussed above, terminates further pattern matching as to the current flow. Otherwise, processing of the data flow continues with receipt of the next packet in the flow.

If the current flow has exhausted the entire behavior pattern (312), traffic classification engine 86 then determines whether the related flow count exceeds a threshold value (324). As discussed above, an implementation of the present invention uses the related flow count to determine whether the transmitting host is behaving pursuant to a peer-to-peer application. As to suspected applications that do not behave in a similar manner, the threshold can be set to one. If the related flow count does not exceed the threshold value (e.g., the current flow may be the first suspected application data flow), traffic classification engine 86 classifies the data flow as unknown (or, in some implementations, as "default") (320) and increments the related flow count (322). If the related flow count exceeds the threshold, traffic classification engine 86 then classifies the data flow as the suspected application (326). As the foregoing illustrates, according to one pattern, traffic classification engine 86 must observe a minimum number or related application data flows that otherwise meet the suspected application pattern, before it classifies subsequent data flows as the suspected application. Accordingly, by adjusting the inter-flow timing and related flow threshold parameters (in conjunction with other pattern attributes or parameters), a variety of different application behavior patterns may be modeled.

Figure 5B:
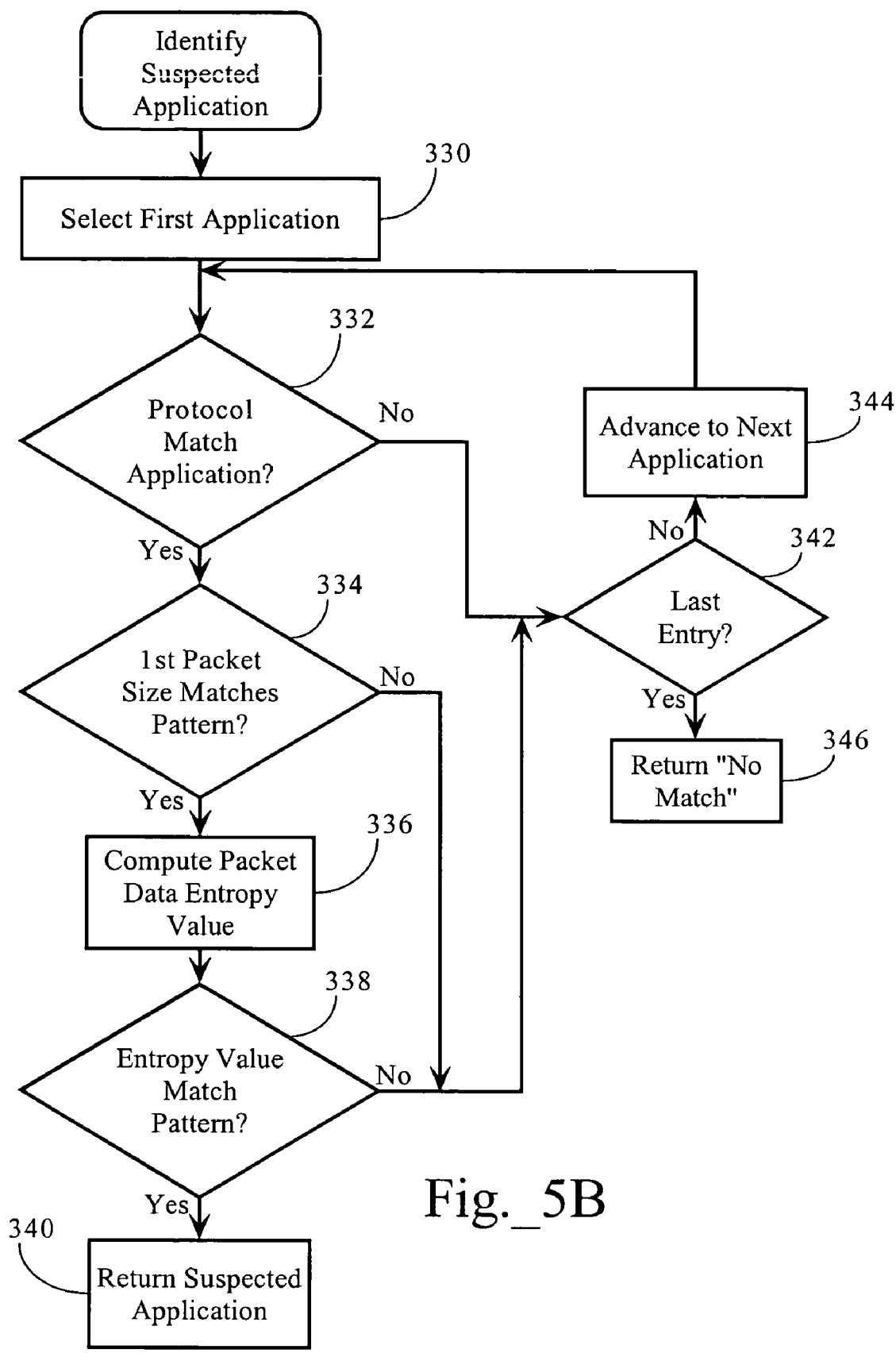

FIG. 5B illustrates a method applied to the first packet of a flow, according to an implementation of the present invention, to initially identify a suspected application. As FIG. 5B illustrates, traffic classification engine 86, in one implementation, processes the first packet in a flow against various criteria sets for each application until a suspected application has been identified. In such an implementation, the order in which the application patterns are traversed becomes important. Of course, in other embodiments, traffic classification engine 86 can process the first packet against all application patterns to identify a pool of suspected applications with the pool being narrowed or entirely eliminated with analysis of subsequent packets in the pool. However, in the method shown in FIG. 5B, traffic classification engine 86, starting with a first application pattern (330), determines whether a protocol explicitly identified in the first packet matches the application pattern (332). As discussed above, the protocol type may be a transport layer protocol identifier, such as TCP or UDP, or other explicitly identifiable protocols. Traffic classification engine 86 then determines whether the first packet matches the size or falls within an allowable size range for the first packet in the pattern (334). If there is a match, traffic classification engine 86 then computes an entropy value to determine the information density of the packet (336) and compares the computed entropy value to a threshold value or allowable entropy range (338). If the first packet matches all pattern attributes, the suspected application is returned (340) and recorded in association with one or more host addresses (see above). Otherwise, traffic classification engine 86 processes the packet against other applications until a suspected application is identified (342, 344), or no suspected application is identified (346).

FIG. 5D illustrates a method for analyzing subsequent packets in a given data flow against a suspected application pattern. As FIG. 5D illustrates, the suspected application pattern includes a single criterion-packet size in the illustrated embodiment. However, other attributes, such as entropy, protocol types, etc. may be included in the analysis as well. In the illustrated implementation, traffic classification engine 86 determines whether the size of the current packet matches the packet size or size range in the suspected application behavior pattern (360). For example, if the current packet is the second received packet, traffic classification engine 86 compares the packet size entry for the second packet in the behavior pattern to the size of the current packet. In one implementation packet count can be maintained in the memory space dedicated to traffic classification engine 86, or can be resolved by simply checking the corresponding packet count attribute in the flow object. As FIG. 5D illustrates, one implementation of the invention compensates for receiving packets out of order. For example, if the current packet size does not match the corresponding entry, traffic classification engine 86 compares the current packet to the requirements of the next entry, if any, in the suspected application pattern (362). In another implementation, traffic classification engine 86 can compare the attributes of the current packet to the adjacent entries in the pattern (i.e., the previous and subsequent entries). As FIG. 5D illustrates, if the current packet satisfies either pattern entry (360, 362), a match is returned (364); otherwise, traffic classification engine 86 returns a "no match" value (366), which, in one implementation, ends further pattern matching for the flow (see above).

As one skilled in the art will recognize, the implementation described above uses a variety of threshold values, such as inter-flow timing, related flow counts, and the like to classify flows. The actual threshold values used, such as minimum related flow count, essentially affects the sensitivity of the traffic classification mechanism. For example, increasing the minimum related flow count requires a larger number of suspected application flows. Increasing the inter-flow timing threshold will increase the sensitivity of the pattern matching implementation described above. In one implementation, these threshold values may be configurable parameters, which a network administrator can adjust based on the behavior of the pattern matching classification mechanisms described herein. For example, if the network administrator feels that the thresholds relating to the pattern matching mechanism are generating false positives or false negatives, he or she can adjust one or more thresholds to alter the behavior of the pattern matching mechanism.

B. Integration of Behavior Pattern Matching into Bandwidth Management Devices

As discussed above, the enhanced traffic classification functionality described above, in one embodiment, can be integrated into a bandwidth management device 130 operative to manage data flows traversing access link 21. The above-identified, commonly-owned patents and patent applications disclose the general functionality and operation of bandwidth management devices. FIG. 2 sets forth a packet-based computer network environment including a bandwidth management device 130. As FIG. 2 shows, local area computer network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and local area network 40. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations or routing nodes. Bandwidth management device 130 is provided between router 22 and local area computer network 40. Bandwidth management device 130 is operative to classify data flows and, depending on the classification, enforce respective bandwidth utilization controls on the data flows to control bandwidth utilization across and optimize network application performance across access link 21.

FIG. 3 is a block diagram illustrating functionality, according to one embodiment of the present invention, included in bandwidth management device 130. In one embodiment, bandwidth management device 130 comprises packet processor 131, flow control module 132, measurement engine 140, traffic classification engine 137, management information base (MIB) 138, traffic discovery module 139, and administrator interface 150. Packet processor 131 is operative to detect new data flows and construct data structures including attributes characterizing the data flow. Flow control module 132 is operative to enforce bandwidth utilization controls on data flows traversing bandwidth management device 130. Traffic classification engine 137 is operative to analyze data flow attributes and identify traffic classes corresponding to the data flows, as discussed more fully below. In one embodiment, traffic classification engine 137, in one implementation, stores traffic classes associated with data flows encountered during operation of bandwidth management device 130, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Management information base 138 is a database of standard and extended network objects related to the operation of bandwidth management device 130. Traffic discovery module 139 is operative to automatically discover traffic classes based on examination of one or more attributes of the data flows traversing bandwidth management device 130. Measurement engine 140 maintains measurement data relating to operation of bandwidth management device 130 to allow for monitoring of bandwidth utilization across access link 21 with respect to a plurality of bandwidth utilization and other network statistics on an aggregate and/or per-traffic-class level. Bandwidth management device 130, in one embodiment, further includes a persistent data store (not shown), such as a hard disk drive, for non-volatile storage of data.

Administrator interface 150 facilitates the configuration of bandwidth management device 130 to adjust or change operational and configuration parameters associated with the device. For example, administrator interface 150 allows administrators to select identified traffic classes and associate them with bandwidth utilization controls (e.g., a partition, a policy, etc.). Administrator interface 150 also displays various views associated with a hierarchical traffic classification scheme and allows administrators to configure or revise the hierarchical traffic classification scheme. Administrator interface 150 also allows a network administrator to view and configure one or more parameters associated with the behavior pattern matching functionality described herein. Administrator interface 150 can be a command line interface or a graphical user interface accessible, for example, through a conventional browser on client device 42.

B.1. Packet Processing

In one embodiment, when packet processor 131 encounters a new data flow it stores the source and destination IP addresses contained in the packet headers in host database 134. Packet processor 131 further constructs a control block (flow) object including attributes characterizing a specific flow between two end systems. In one embodiment, packet processor 131 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix database identifiers, and the like. Packet processor 131, in one embodiment, reserves memory space in the dynamic memory pool for storing such variably-sized attribute information as flows traverse bandwidth management device 130. Packet processor 131 also stores received packets in a buffer structure for processing. In one embodiment, the packets are stored in the buffer structure with a wrapper including various information fields, such as the time the packet was received, the packet flow direction (inbound or outbound), and a pointer to the control block object corresponding to the flow of which the packet is a part.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 2 illustrates the concept associated with inside and outside addresses. As discussed above, in one embodiment, a flow specification object includes an "inside" and "outside" address relative to bandwidth management device 130. See FIG. 2. For a TCP/IP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow. As discussed above, in one embodiment, the control block object attributes further include a packet count corresponding to the number of packets associated with the flow to allow for such operations as the application of policies based on packet counts.

To allow for identification of service types (e.g., FTP, HTTP, etc.), packet processor 131, in one embodiment, is supported by one to a plurality of service identification tables in a relational database that allow for identification of a particular service type (e.g., application, protocol, etc.) based on the attributes of a particular data flow. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 130 encounters a new flow, packet processor 131 analyzes the data flow against the service attributes in the services table to identify a service ID corresponding to the flow. In one embodiment, packet processor 131 may identify more than one service ID associated with the flow. In this instance, packet processor 131 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor associates the flow with the most specific service ID. A traffic class may be configured to include matching rules based on the service IDs in the services table. For example, a matching rule directed to HTTP traffic may simply refer to the corresponding service ID, as opposed to the individual attributes that packet processor 131 uses to initially identify the service.

In one embodiment, when packet processor 131 inspects a flow it may detect information relating to a second, subsequent flow (e.g., an initial FTP command connection being the harbinger of a subsequent data connection, etc.). Packet processor 131, in response to such flows populates a remembrance table with attributes gleaned from the first flow, such as IP addresses of the connection end points, port numbers, and the like. Packet processor 131 scans attributes of subsequent flows against the remembrance table to potentially associate the subsequent flow with the first flow and to assist in identification of the second flow.

B.2. Flow Control Module

As discussed above, flow control module 132 enforces bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

B.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or Limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

B.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

B.3. Traffic Classification

A traffic class comprises a set of matching rules or attributes allowing for logical grouping of data flows that share the same characteristic or set of characteristics—e.g., a service ID or type (see Section B.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, bandwidth management device 130 includes functionality allowing for classification of network traffic based on information from layers 2 to 7 of the OSI reference model.

In one implementation, bandwidth management device 130 allows a network administrator to select from a set of pre-configured traffic classes corresponding to known network applications and add them to the configuration of traffic classification engine 137. Bandwidth management device 130, in one embodiment, allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. Administrator interface 150, in one embodiment, also allows for the selection and arrangement of traffic classes into hierarchical reference trees. In one embodiment, traffic classification engine 137 also stores traffic classes added by traffic discovery module 139.

Traffic classification engine 137 stores traffic classes associated with data flows that traverse access link 21. Traffic classification engine 137, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Bandwidth management device 130 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at Least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 137 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.3.a. Automatic Traffic Classification

As discussed above, traffic discovery module 139, in one implementation, analyzes data flows for which no matching traffic class was found in traffic classification engine 137. Traffic discovery module 139, in one embodiment, is operative to apply predefined sets of matching rules to identify a traffic class corresponding to non-matching data flows. In one implementation, traffic discovery module 139 operates on data flows classified as either /Inbound/Default or Outbound/Default. In one embodiment, traffic discovery module 139 is configured to include a predefined set of traffic classes based upon a knowledge base gleaned from observation of common or known traffic types on current networks. In one embodiment, traffic discovery module 139 creates traffic classes automatically in response to data flows traversing bandwidth management device 130 and stores such traffic classes in traffic classification engine 137. Automatic traffic classification is disclosed in U.S. Pat. Nos. 6,412,000, 6,457,051, and 6,591,299, which are incorporated herein by reference.

As discussed above, traffic discovery module 139 applies one or more traffic discovery thresholds when deciding whether to present or add newly discovered traffic classes. In one embodiment, traffic discovery module 139 must detect a minimum number of data flows within a predefined period for a given traffic type before it creates a traffic class in traffic classification engine 137. In one embodiment, such discovered traffic classes are, by default, attached to or associated with either the "/inbound/autodiscovered/" or "/outbound/autodiscovered/" bandwidth control category, as appropriate. As discussed below, administrator interface 150 allows for configuration of bandwidth controls for auto-discovered traffic classes. In one embodiment, auto-discovered traffic classes are automatically assigned predefined bandwidth utilization controls. U.S. patent application Ser. No. 09/198,051, incorporated by reference herein, discloses automatic assignment of bandwidth utilization controls for discovered traffic classes. Furthermore, as discussed above, traffic discovery module 139 is operative to dynamically adjust one or more traffic discovery thresholds depending on at least one observed parameter or attribute, such as the rate of discovering new traffic classes relative to the number of data flows.

In one implementation, traffic discovery module 139 automatically adds newly discovered traffic classes to traffic classification engine 137, which are presented to the network administrator with manually configured and/or previously discovered traffic classes. In an alternative embodiment, traffic discovery module 139 may save the newly discovered traffic classes in a separate data structure and display them separately to a network administrator. The list may be sorted by any well-known criteria such as: 1) most "hits" during a recent interval, 2) most recently-seen (most recent time first), 3) most data transferred (bytes/second) during some interval, or a moving average. The user may choose an interval length or display cutoff point (how many items, how recent, at Least B bytes per second, or other thresholds). The Network manager may then take some action (e.g. pushing a button) to select the traffic types she wishes to add to the classification tree.

B.3.b. Application Behavior Pattern Matching

The application behavior pattern matching functionality described above can be integrated into bandwidth management device 130 in a variety of ways. For example, in one implementation, the application behavior pattern matching functionality can be implemented as an extension (e.g., provided by a plug-in, etc.) to traffic classification engine 137 in one to a plurality of subroutines. In another implementation, the application behavior pattern matching functionality of the present invention may also be implemented as a separate software module.

Furthermore, as discussed above, the application behavior pattern matching functionality essentially classifies otherwise unknown traffic into one to a plurality of applications or traffic classes. In one implementation, a network administrator may explicitly add one or more of these traffic classes to the configuration of traffic classification engine 137, or similar to automatic traffic discovery, allow such traffic classes to be added to the configuration of traffic classification engine 137 when data flows associated with a given traffic class is encountered. In one implementation, traffic classes which use pattern matching are added at the end of the traffic classification configuration such that they are applied if no other traffic class is found to match the data flows. In addition, the pattern matching functionality can operate similarly to the traffic discovery module 139 by adding traffic classes to the configuration of traffic classification engine 137 upon detection of a sufficient number of data flows from a given host, and/or a threshold number of hosts. In another implementation, the pattern matching classification functionality is applied only if traffic discovery module 139 also fails to identify a traffic class. In another implementation, the enhanced behavior pattern matching functionality described herein can be applied only to data flows associated with suspicious activities, as disclosed in U.S. application Ser. No. 10/295,391. As the foregoing illustrates, one skilled in the art will recognize that a variety of configurations are possible with the various configurations presenting tradeoffs between each other.

FIG. 8 illustrates how, according to one implementation of the present invention, the pattern matching classification functionality can be applied relative to other traffic classification processes, such as traffic classification involving application of basic matching rules to packet attributes, and automatic traffic discovery. In one implementation, a packet is passed to traffic classification engine 137 (402), which attempts to classify the data flow based on inspection of one or more packet attributes (404). If a traffic class is explicitly identified, classification of the data flow ends. Otherwise, the packet is flagged (406), or otherwise passed, to traffic discovery module 139, which attempts to identify a traffic class, as discussed above. If a traffic class is identified by traffic discovery module 139, classification of the data flow ends. However, if traffic discovery module 139 is not capable of classifying the data flow, the packet is passed to the application behavior pattern matching functionality described herein (410). In one implementation, if a traffic class is discovered using application behavior pattern matching, it can be added to the traffic classification configuration as other newly discovered traffic classes similar to the processes described above relating to automatic traffic discovery. As discussed above, this process flow is one of a variety of possible process flows.

B.4. Enforcement of Bandwidth Utilization Controls

Figure 7:
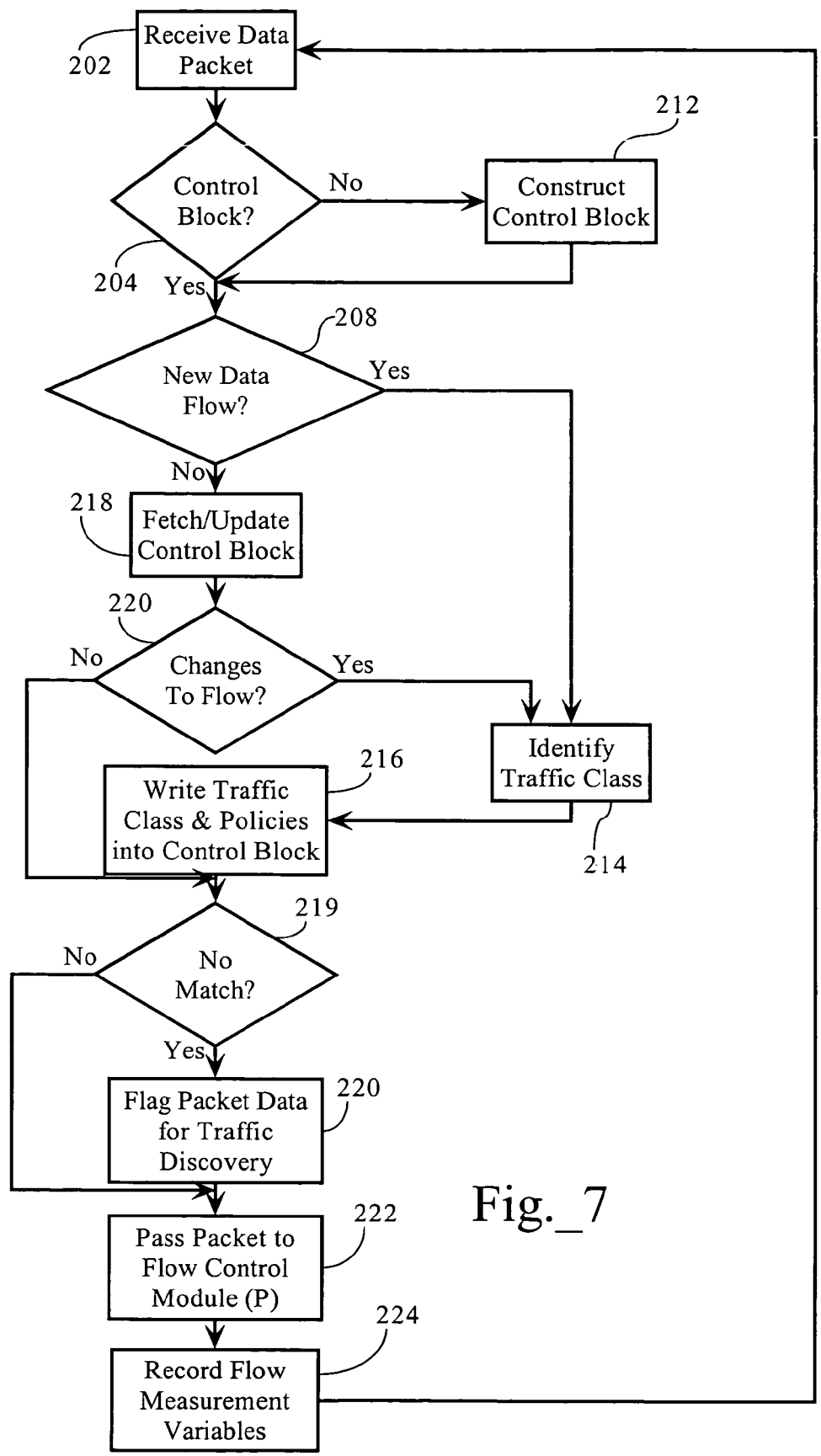
FIG. 7 is a flow chart diagram providing a method directed to enforcing bandwidth utilization controls on data flows.

FIG. 7 illustrates a method, according to one embodiment of the present invention, directed to the enforcement of bandwidth utilization controls on data flows transmitted across access Link 21 and, therefore, traversing bandwidth management device 130. The method for enforcing bandwidth utilization controls, however, is not critical to the present invention; any suitable method can be employed.

In one embodiment, packet processor 131 receives a data packet (FIG. 7, 202) and determines whether flow database 135 contains an existing control block object corresponding to the data flow (204) (see Section B.1., supra). If no control block object corresponds to the data packet, packet processor 131 constructs a control block object including attributes characterizing the data flow, such as source address, destination address, service type, etc. (212) (see above). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in the dynamic memory pool, and other parameters characterizing the data flow.

If a control block object is found, as FIG. 7 illustrates, packet processor 131 then determines whether the received packet is part of a new data flow (208) or represents a change to an existing data flow (see 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In one embodiment, if the last packet time does exceed a threshold, this signals to the packet processor 131 that the previous flow has terminated, causing the packet processor 131 to notify FDR emitter 139. In another embodiment, a separate process monitors the last packet times associated with UDP, GRE and similar flow types to detect termination of a given flow. In some embodiments, packet processor 131 may have to encounter multiple packets to identify and fully characterize a new data flow (e.g., identify a service type, traffic class, etc.). For example, U.S. Pat. No. 6,046,980 and U.S. Pat. No. 6,591,299, identified above, discloses methods for classifying packet network flows.

If the data packet does not signify a new data flow, packet processor 131 retrieves the control block object, and associates the packet with the control block object (218). If elements of the data packet represent a change to the traffic type associated with the data flow (220), packet processor 131 passes the flow specification object to traffic classification engine 137 to identify a traffic class corresponding to the flow (214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with the data flow, packet processor 131 passes the control block object (or a pointer to the control block object) to traffic classification engine 137. In one embodiment, the control block object or a copy of it is stored in association with the packet and in the same buffer structure to facilitate access to the control block object by traffic classification engine 137. As discussed in more detail below, traffic classification engine 137 operates on attributes of the control block object and/or flow specification object, (and potentially on the packet stored in the buffer structure) to identify traffic class (es) associated with the data flow (214). In one embodiment, the control block object in flow database 135 includes a pointer to the identified traffic class(es) in traffic classification engine 137. In one embodiment, the traffic classification engine 137 stores in the control block object the policy parameters (e.g., bandwidth utilization control parameters, security policies, etc.) associated with the identified traffic classes (216). As discussed above, if the data flow does not match an existing traffic class (219), packet processor 82 or traffic classification engine 137 flags the packet for traffic discovery module 139 (220). In one embodiment, a data flow that does not match an existing traffic class is classified in the default traffic class. Traffic discovery module 139 operates on attributes of the data flow to classify it as discussed above. If the identified traffic class exceeds a discovery threshold, traffic discovery module 139, in one implementation, adds the discovered traffic class to traffic classification engine 137. In one implementation, traffic discovery module 139 also writes default bandwidth utilization controls and/or other policies (such as security or redirection policies) into traffic classification engine 137. In another embodiment, newly discovered traffic classes can be added to a separate list, or other data structure, from which a network administrator may elect to add to the traffic classification configuration maintained by traffic classification engine 137.

Packet processor 131 then passes the packet to rate control module 132 (222) which accesses the control block object corresponding to the data flow to retrieve the bandwidth utilization or other controls (e.g., partition, policy, security controls, etc.) associated with the traffic class and enforces the bandwidth utilization controls on the data packet flow. As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. As FIG. 7 illustrates, packet processor 131 also records or updates various measurement values in the control block object that characterize the flow (e.g., last packet time, packet count, byte count, etc.) (224). In addition, measurement engine 140, in one embodiment, records data associated with the packet to allow for analysis of bandwidth utilization and other network statistics on a traffic class, access link, and/or partition level.

Lastly, although the present invention has been described as operating in connection with end systems and networks primarily employing the HTTP, TCP and IP protocols, the present invention has application in computer network environments employing any suitable session layer, transport layer and network layer protocols. Moreover, one skilled in the art will recognize that the present invention can be used in connection with application behavior patterns incorporating a variety of behavior attribute combinations described above. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method facilitating classification of data flows, comprising monitoring, by a network device, a data flow associated with a host relative to at least one behavioral attribute;
   comparing the at least one behavioral attribute observed in the monitoring step to a knowledge base of at least one known application behavior pattern, wherein the at least one known application behavior pattern corresponds to a network application classification and comprises one or more behavioral attribute parameter values indicating a pattern of expected packet sizes for one or more packets of a data flow corresponding to the network application classification; and
   classifying the data flow into the network application classification by matching packet sizes of packets of the data flow to the pattern of expected packet sizes.

2. The method of claim 1 wherein the pattern of expected packet sizes includes a packet size of the first packet in the data flow corresponding to the network application classification.

3. The method of claim 1 wherein the pattern of expected packet sizes includes a packet size of the second packet in the data flow corresponding to the network application classification.

4. The method of claim 1 wherein the pattern of expected packet sizes includes packet sizes for a plurality of packets in the data flow corresponding to the network application classification.

5. A method facilitating classification of data flows, comprising monitoring, by a network device, a data flow associated with a host relative to at least one behavioral attribute;
   comparing the at least one behavioral attribute observed in the monitoring step to a knowledge base of at least one known application behavior pattern, wherein the at least one known application behavior pattern corresponds to a network application classification and comprises one or more behavioral attribute parameter values indicating a pattern of expected information density associated with at least one packet in the data flow corresponding to the network application classification, wherein the information density corresponds to a level of randomness of data of the at least one packet; and
   classifying the data flow into the network application classification by matching information density of packets of the data flow to the pattern of expected information density.

6. The method of claim 5 wherein the pattern of expected information density comprises the information density associated with the first packet in the data flow.

7. The method of claim 1 wherein at least one behavioral attribute parameter value of the one or more behavioral attribute parameter values indicates the timing of the data flow relative to at least one similar data flow associated with the host.

8. The method of claim 1 wherein at least one behavioral attribute parameter value of the one or more behavioral attribute parameter values indicates the number of related data flows associated with the host.

9. The method of claim 1 wherein at least one behavioral attribute parameter value of the one or more behavioral attribute parameter values indicates the timing between at least two packets in the data flow.

10. The method of claim 1 wherein at least one behavioral attribute parameter values of the one or more behavioral attribute parameter values indicates a sequence of protocol flags contained in packets of the data flow.

11. The method of claim 1 wherein at least one behavioral attribute parameter values of the one or more behavioral attribute parameter values indicates a timing of protocol flags contained in packets of the data flow.

12. The method of claim 1 wherein at least one behavioral attribute parameter values of the one or more behavioral attribute parameter values indicates a timing and sequence protocol flags contained in packets of the data flow.

13. The method of claim 1 wherein the application behavior pattern comprises at least one instance of any one of the following: a packet size pattern, a threshold information density value, a threshold inter-flow timing value, or a threshold number of related application data flows.

14. The method of claim 1 wherein the application behavior pattern characterizes the first group of packets of a data flow associated with a traffic class.

15. The method of claim 13 wherein the application behavior pattern characterizes the first group of packets of a data flow associated with a traffic class, and wherein the first group of packets are characterized in relation to at least one instance of any one of the following: a packet size pattern, a threshold information density value, a threshold inter-flow timing value, or a threshold number of related application data flows.

16. A method facilitating classification of data flows, comprising
   modeling behavior of a network application to generate an application behavior pattern corresponding to the network application; and
   configuring a network traffic monitoring device to monitor data flows relative to at least one behavioral attribute and classify the data flows into a traffic class of a plurality of traffic classes by comparing one or more of the data flows against the application behavior pattern; wherein the application behavior pattern comprises at least one instance of any one of the following: a pattern of expected packet sizes for one or more packets of a data flow corresponding to the network application, a pattern of expected threshold information density values for one or more packets of a data flow corresponding to the network application, a threshold inter-flow timing value between data flows corresponding to a host, or a threshold number of related application data flows corresponding to a host.

17. The method of claim 16 wherein the application behavior pattern further comprises at least one instance of any one of the following: an inter-packet timing value between a plurality of packets of a data flow corresponding to the network application, a sequence of protocol flags in a plurality of packets of a data flow corresponding to the network application, an inter-packet protocol flag timing value corresponding to a plurality of packets of a data flow corresponding to the network application.

18. The method of claim 17 wherein the protocol flags are Transport Control Protocol (TCP) protocol flags.

19. A method facilitating classification of data flows, comprising
monitoring, by a network device, the data flows associated with a host relative to at least one application behavior model corresponding to a traffic class;
matching, by the network device, at least one of the data flows associated with the host to a traffic class, if a threshold number of the data flows match a corresponding application behavior model; wherein the application behavior model comprises at least one instance of any one of the following: a pattern of expected packet sizes for one or more packets of a data flow corresponding to the network application, a pattern of expected threshold information density values for one or more packets of a data flow corresponding to the network application, a threshold inter-flow timing value between data flows corresponding to a host, a threshold number of related application data flows corresponding to a host, an inter-packet timing value between a plurality of packets of a data flow corresponding to the network application, a sequence of protocol flags in a plurality of packets of a data flow corresponding to the network application, an inter-packet protocol flag timing value corresponding to a plurality of packets of a data flow corresponding to the network application.

20. An apparatus comprising
a packet processor operative to
detect data flows in network traffic traversing a communications path, the data flows each comprising at least one packet;
parse at least one packet associated with a data flow into a flow specification, a traffic classification engine operative to
match the data flow to a plurality of traffic classes, wherein at least one of the plurality of traffic classes is defined by one or more matching attributes, wherein said matching attributes are explicitly presented in the packets associated with the data flows, and wherein at least one other of the traffic classes is defined by one or more application behavior patterns, wherein the application behavior patterns each comprise at least one instance of any one of the following: a pattern of expected packet sizes for one or more packets of a data flow corresponding to a traffic class, a pattern of expected threshold information density values for one or more packets of a data flow corresponding to a traffic class, a threshold inter-flow timing value between data flows corresponding to a host, a threshold number of related application data flows corresponding to a host, an inter-packet timing value between a plurality of packets of a data flow, a sequence of protocol flags in a plurality of packets of a data flow, or an inter-packet protocol flag timing value between a plurality of packets of a data flow;
having found a matching traffic class in the matching step, associate the flow specification corresponding to the data flow with a traffic class from the plurality of traffic classes.

21. The apparatus of claim 20 wherein said flow specification contains at least one instance of any one of the following: a protocol family designation, a direction of packet flow designation, a protocol type designation, a pair of hosts, a pair of ports, a pointer to a multipurpose internet mail extensions (MIME) type, and a pointer to an application-specific attribute.

22. The apparatus of claim 20 wherein said flow specification contains, and wherein the one or more matching attributes include, at least one instance of any one of the following: a protocol family designation, a direction of packet flow designation, a protocol type designation, a pair of hosts, a pair of ports, a pointer to a multipurpose internet mail extensions (MIME) type, and a pointer to an application-specific attribute.

23. The apparatus of claim 20 further comprising
a flow control module operative to apply bandwidth utilization controls to the data flows based on the traffic class associated with the data flows.

24. A method facilitating classification of data flows, comprising
detecting, by a network device, a data flow in network traffic traversing a communications path, the data flow each comprising at least one packet;
parsing, by the network device, explicit attributes of at least one packet associated with the data flow into a flow specification,
matching, by the network device, the flow specification to a first plurality of traffic classes, wherein the first plurality of traffic classes are each defined by one or more matching attributes,
having found a matching traffic class in the matching step, associating, by the network device, the flow specification corresponding to the data flow with a traffic class from the first plurality of traffic classes,
not having found a matching traffic class in the first plurality of traffic classes, matching, by the network device, the data flow to at least one additional traffic class, the additional traffic class defined by an application behavior pattern, the application behavior pattern comprising comprises at least one instance of: a pattern of expected packet sizes for one or more packets of a data flow, a pattern of expected threshold information density values for one or more packets of a data flow, a threshold inter-flow timing value between data flows corresponding to a host, or a threshold number of related application data flows corresponding to a host.

25. The method of claim 24 wherein the flow specification contains at least one instance of any one of the following: a protocol family designation, a direction of packet flow designation, a protocol type designation, a pair of hosts, a pair of ports, a pointer to a multipurpose internet mail extensions (MIME) type, and a pointer to an application-specific attribute.

26. The method of claim 24 wherein said flow specification contains, and wherein the one or more matching attributes include, at least one instance of any one of the following: a protocol family designation, a direction of packet flow designation, a protocol type designation, a pair of hosts, a pair of ports, a pointer to a multipurpose internet mail extensions (MIME) type, and a pointer to an application-specific attribute.

27. A method facilitating the classification of network traffic, comprising
   detecting, by a network device, a data flow in network traffic traversing a communications path, the data flow comprising at least one packet;
   classifying, by the network device, the data flow into a network application of a plurality of network applications by
      applying a mathematical function to at least one packet in the data flow to derive a computed value that characterizes entropy of information contained in the at least one packet, wherein the entropy information corresponds to a level of randomness of data of the at least one packet; and
      comparing the computed value to at least one traffic class corresponding to the network application, said traffic class defined, at least in part, by a required computed entropy value.

28. The method of claim 27 wherein the required computed value is determined by applying the mathematical function to data flows known to be of the traffic class.

29. The method of claim 27 wherein the mathematical function computes a value indicating the information density of at least one packet.

30. The method of claim 27 wherein the required computed value is a range of values.

31. A method facilitating the classification of network traffic, comprising
   detecting, by a network device, a data flow in network traffic traversing a communications path, the data flow comprising at least one packet containing a first checksum;
   applying, by the network device, a mathematical function to at least one packet in the data flow to derive a second checksum;
   comparing, by the network device, the computed second checksum to the first checksum contained in the at least one packet;
   matching, by the network device, the data flow to a traffic class, wherein the traffic class is defined at least in part by whether the computed second checksum should match the first checksum in the at least one packet.

* * * * *